D. WATSON.
Evaporating Pans.

No. 143,649.  Patented Oct. 14, 1873.

UNITED STATES PATENT OFFICE.

DAVID WATSON, OF MEXICO, MEXICO.

IMPROVEMENT IN EVAPORATING-PANS.

Specification forming part of Letters Patent No. 143,649, dated October 14, 1873; application filed August 4, 1873.

*To all whom it may concern:*

Be it known that I, DAVID WATSON, of the city of Mexico, Mexico, have invented a new and useful Improvement in Machinery for Sugar-Making, of which the following is a specification:

The invention consists in providing the evaporating pan or vessel with a channel or canal surrounding the same at the top, and leading at the ends into a filter, which is in communication with said pan or vessel near the bottom, as hereinafter described, the object of such arrangement being to receive the overflow caused by ebullition of the saccharine juice, and filter or strain the same before it again enters the vessel.

Figure 1:
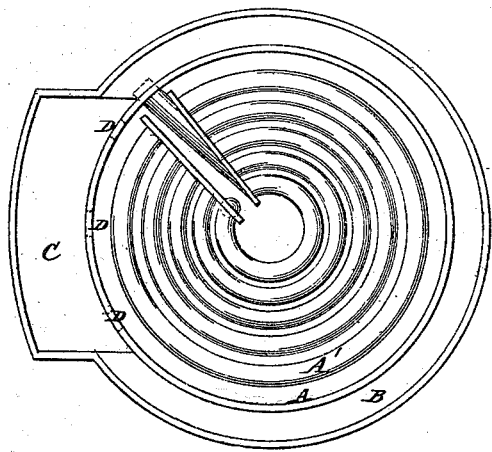
Figure 2:
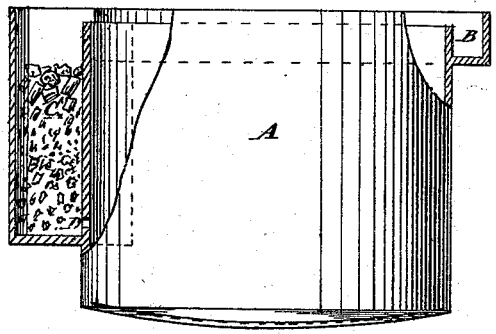

In the accompanying drawing, Figure 1 is a plan view of the evaporators, having a channel for the overflow and a filter in connection therewith. Fig. 2 is a side elevation with some parts broken out.

A represents the evaporator; B, the channel or canal at the top; C, the filter, into which the canal discharges; and D, the passage through which the juice flows back into the evaporator. The channel is formed by a casing on the outside of the pan, and the filter is attached in the same way, but extends vertically downward to near the bottom of the pan. The filtering-chamber is filled with charcoal, or other equivalent substance.

This arrangement is at once simple, efficient, and inexpensive.

Having described my invention, what I claim as new, and desire to secure by Letters Patent, is—

The evaporating-vessel A, provided with the trough B around the top, and with the filter C, which communicates with said vessel by means of the passage D, as shown and described.

The above specification of my invention signed by me this 28th day of June, 1873.

DAVID WATSON.

Witnesses:
T. NEVEN,
FELIPE N. CASTANEDA.